United States Patent [19]

Clements et al.

[11] Patent Number: 4,642,792
[45] Date of Patent: Feb. 10, 1987

[54] DATA PROCESSOR PRINTER SETUP THROUGH A REMOTE DISPLAY TERMINAL

[75] Inventors: Silous F. Clements, Georgetown; Patrick D. Motola; Shirley F. Swift, both of Austin, all of Tex.

[73] Assignee: International Business Machines Corporation, Armonk, N.Y.

[21] Appl. No.: 798,703

[22] Filed: Nov. 15, 1985

Related U.S. Application Data

[63] Continuation of Ser. No. 450,860, Dec. 20, 1982, abandoned.

[51] Int. Cl.$^4$ .............................................. G06F 3/12
[52] U.S. Cl. ..................................................... 364/900
[58] Field of Search ... 364/200 MS File, 900 MS File; 400/76

[56] References Cited

U.S. PATENT DOCUMENTS

| | | | |
|---|---|---|---|
| 4,150,429 | 4/1979 | Ying | 364/200 |
| 4,198,685 | 4/1980 | Corwin et al. | 364/900 |
| 4,204,206 | 5/1980 | Bakula et al. | 340/721 |
| 4,330,847 | 5/1982 | Kuseski | 364/900 |
| 4,430,725 | 2/1984 | Elliott et al. | 364/900 |
| 4,441,163 | 4/1984 | Leikam et al. | 364/900 |
| 4,454,576 | 6/1984 | McInroy et al. | 364/900 |
| 4,456,969 | 6/1984 | Herzik et al. | 364/900 |
| 4,458,311 | 7/1984 | Clements et al. | 364/200 |
| 4,559,614 | 12/1985 | Peck et al. | 364/900 |

FOREIGN PATENT DOCUMENTS 0066038 12/1982 European Pat. Off. .

OTHER PUBLICATIONS

*IBM Technical Disclosure Bulletin*, vol. 24, No. 11B, Apr. 1982, pp. 5885–5886, "Printer Data Processing-/Word Processing Enhanced Controller System", B. R. Cavill et al.

*Elektrie*, vol. 34, No. 9. 1980, pp. 489–496, W. Dietze et al, "Anwendung der Mikroelektronik Bildschirmarbeitsplatzen und elektronischen Textverarbeitungssystemen".

*Computer Design*, vol. 19, No. 9, Sep. 1980, p. 68, "Microprocessor Controlled Printer System Emulates DEC-20 Controller".

*IBM Technical Disclosure Bulletin*, vol. 24, No. 8, Jan. 1982, pp. 4099–4100, "Realtime Processing of Printer Setup Changes and Sheetfeed Requirements on an Impact Printer with Sheetfeed Attachment", P. R. Daniels et al.

*Primary Examiner*—James D. Thomas
*Assistant Examiner*—Thomas C. Lee
*Attorney, Agent, or Firm*—Marilyn D. Smith; J. B. Kraft

[57] ABSTRACT

The disclosure relates to an improvement in data processing systems involving a host processor and a remote printer which prints alphanumeric characters from data communicated from the host to the printer. The improvement provides the provision of an intermediate processor having an interactive display terminal. There are means in this intermediate processor for controlling the setup of repetitive format parameters of documents containing the alphanumeric characters printed by the printer. In addition, there are means on the display terminal for displaying in the form of a menu the various document parameters available to the setup means in the intermediate processor. Thus, an operator at the display terminal may select appropriate parameters for setting up the repetitive format of the document.

6 Claims, 5 Drawing Figures

DATA PROCESSOR PRINTER SETUP THROUGH A REMOTE DISPLAY TERMINAL

CROSS REFERENCE TO RELATED APPLICATION

This application is a continuation of U.S. patent application Ser. No. 450,860, filed Dec. 20, 1982, and now abandoned.

TECHNICAL FIELD

The present invention relates to data processing systems and particularly to data processing systems having remote printer capability, i.e., the data processor transmits the material to be printed as a data stream to the printer at a remote location where the printout from the processor is produced.

BACKGROUND ART

For many years in the data processing field, printing out of data from a central processor has been a fairly straightforward operation. In general, a plurality of printers were associated with central processor. These printers could be at locations or output stations adjacent to the central processor or remote from the central processor. In the latter case, of course, the central processor transmitted the alphanumeric data stream to be printed to the receiving printer which proceeded to produce the printout. With such conventional systems, the printers were in effect dedicated to the central processor, i.e., to primarily produce printout for the central processor. In operating such substantially dedicated printers, the operator at the printer could set repetitive formatting parameters such as line spacing, maximum lines per page, pitch, lines per inch, or characters per line on the printer to suit particular processor with which the printer was associated and such parameters would remain substantially unchanged for considerable periods of time. With data processing printouts, in general, format was not an important consideration and consequently formats were not changed frequently.

In recent years, however, there has been a trend towards the combination of data processing facilities and text processing facilities into electronic distribution networks which are capable of transmitting and printing out both data processing and text processing documents at any one of a plurality of workstations within the network. Copending patent application Ser. No. 310,184, now issued as U.S. Pat. No. 4,458,311, "A Text Having an Interactive Display Terminal Which Alternately Functions as a Data Processing Terminal", Filed Oct. 9, 1981, S. F. Clements et al, assigned to the same assignee as the present invention, is an example of a system having combined data processing and text processing capabilities. In addition, U.S. Pat. No. 4,532,588, "An Electronic Document Distribution Network with Uniform Data Stream", Filed Nov. 9, 1982, G. J. Foster, also assigned to the same assignee of the present invention describes an electronic document distribution network.

Because of the above developments in the data process field, there has been an increasing need for systems having printers which are not formatted to support any particular data processor but rather capable of providing printouts from a wide variety of data processors or even text processors capable of transmitting a data stream to that particular printer output station.

Consequently, printers which require a "hands on" operator to change the above described repetitive formatting parameters cannot serve efficiently these systems. The system must have the capability of effectively and quickly switching one particular printout format to another.

DISCLOSURE OF THE INVENTION

In a data processing system comprising a host processor and a remote printer controlled by the host processor to print alphanumeric data from a data stream communicated from the host to the printer, the present invention provides an improvement comprising an intermediate processor having an interactive display terminal. There are means in this intermediate processor for controlling the setup of format parameters for the document or printout of the alphanumeric data from the host processor to be printed by the printer. This interactive terminal further includes means for displaying on the display the document parameters (as a menu) available for the setup means. In this way an operator at the terminal may select appropriate parameters through an I/O device such as a keyboard to provide the desired format setup for the printer in printing out the document.

In accordance with one aspect of the present invention, the intermediate processor may be a text processor of the type described in the above referenced copending application Ser. No. 310,184 (issued U.S. Pat. No. 4,458,311) thus, this intermediate text processor will provide the operator with the capability of selecting the repetitive setup format parameters which will control the printing of the documents from the host data processor as well as the format parameters which will control the printing of the documents processed within this intermediate text processor. In addition, the intermediate text processor of course will have the capability of readily switching the printing operation based on data input from the host processor to printing operations of documents based upon input from this intermediate text processor.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
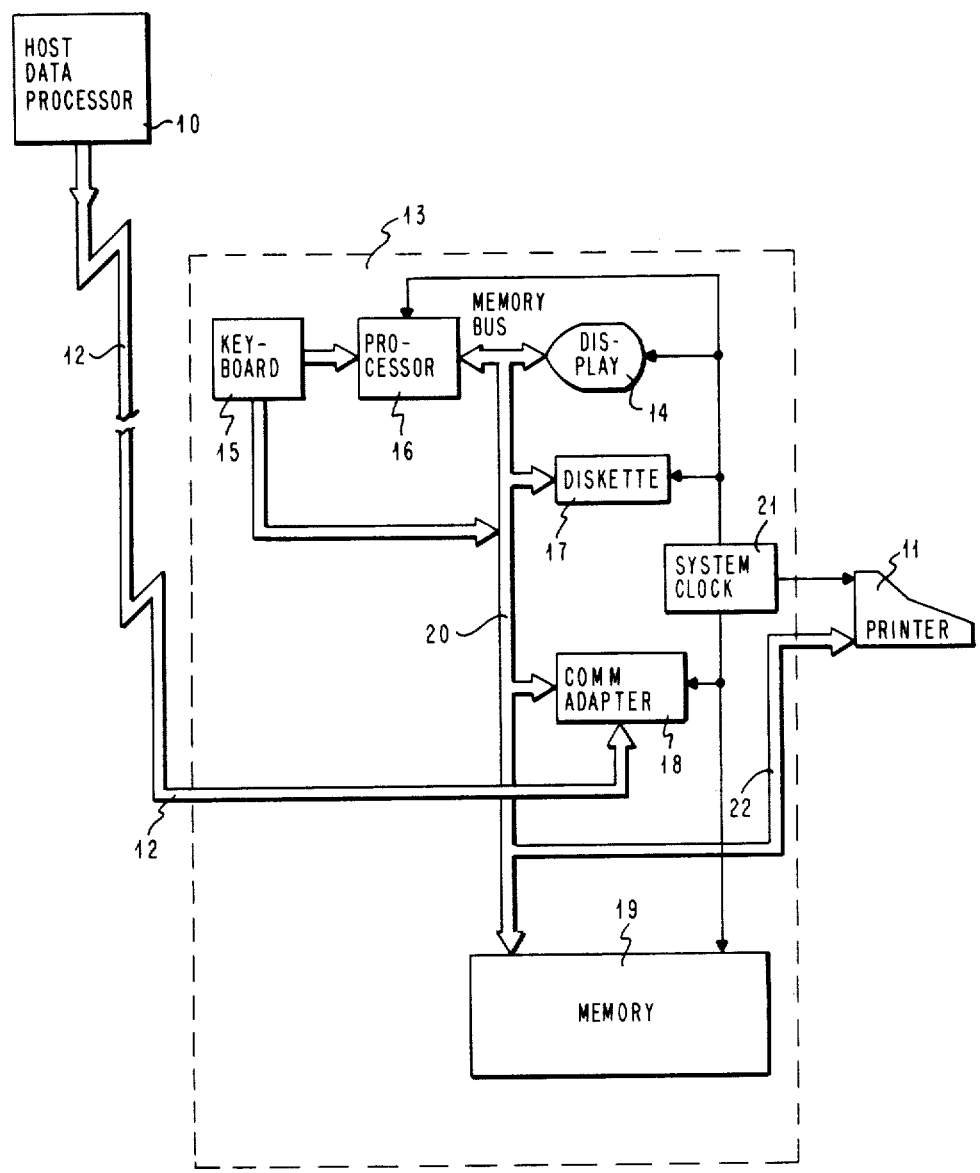
FIG. 1 is a logical block diagram showing the apparatus of the present invention in a generalized form.

With reference to FIG. 1, a generalized view of the apparatus which may be used to carry out the present invention is shown. The overall system comprises a central data processor 10 such as an IBM 370 computer which has data to be printed on a printer 11 which is remote from the central processor 10. Host processor 10 communicates with printer 11 through a communication linkage 12 which is represented by a buss. Communication between host processor 10 and printer 11 is through an intermediate processor 13 having an interactive display terminal 14. Processor 13 may be a text processor of the type described in the above referred to U.S. Pat. No. 4,458,311, and the communication linkage between processor 13 and host processor 10 may also be similar to that described in U.S. Pat. No. 4,458,311. Text processor 13 includes a communications adapter 18 connected to buss 12. In processor 13, the operator accesses the processor through operator control keys on keyboard 15. The keyboard drives an internal microprocessor 16 which is operably connected to the visual display terminal 14 as well as to a diskette storage means 17 and a random access memory 19 through memory buss 20. A system clock 21 is provided for timing functions within the text processor 13. The printer 11 is communicated with over buss 22. Memory 19 provides means for storing data within the processor 13 and the programs for controlling display 14 to display data or to control printer 11 to print data. Memory 19 includes a number of data areas and functional programs for operating the data input into it through buss 20 from communications adapter 18.

Figure 2:
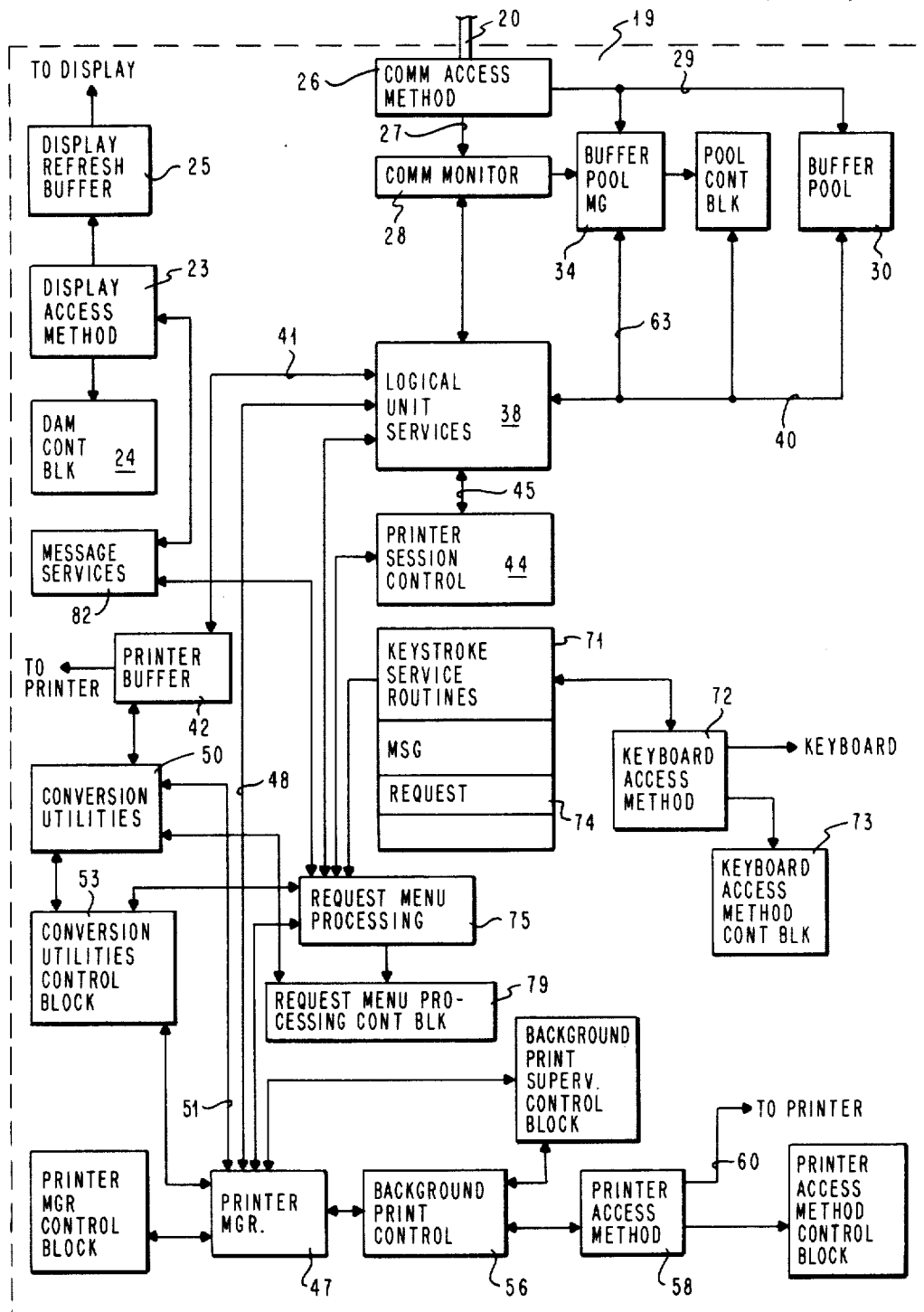
FIG. 2 is a logical block diagram showing the apparatus in the intermediate processor which is involved in setting up of the printer in accordance with the present invention.

FIG. 2 shows the elements of memory 19 and particularly the functional programs which relate to the printing control operation of the present invention.

The displaying of data on display 14 of FIG. 1 may be done in any conventional manner. For example, data may be displayed in accordance with the procedure described in U.S. Pat. No. 4,445,194, filed Nov. 20, 1980, W. C. Cason et al. In general, the data to be displayed must be communicated to the display access method 23 which is in memory 19 in FIG. 2 and under the control of the display access method control block 24. The data from the display access method 23 is applied to display refresh buffer 25 which operates in a conventional manner referred to above to maintain alphanumeric text representative of the stored data on the visual display screen 14 of FIG. 1. In subsequent descriptions of the operation of the present invention there will be described operations wherein the host data processor 10 communicates with memory 19 through communication linkage 12 and communications adapter 18 which accesses memory 19 through buss 20. In such an operation, the data from the communications adapter 18 enters memory 19 (FIG. 2) on buss 20 and is input into communications access method 26 after which the data is input over channel 27 to communications monitor 28. Information from communication access method 26 is input over buss 29 to buffer pool 30. The remaining functional units in FIG. 2 will be described in connection with the data processing routines of FIGS. 3-5.

Now using the logic and memory described above with respect to FIGS. 1 and 2, the operations involved in the present invention will be described with respect to the flow charts in FIGS. 3-5.

Figure 3:
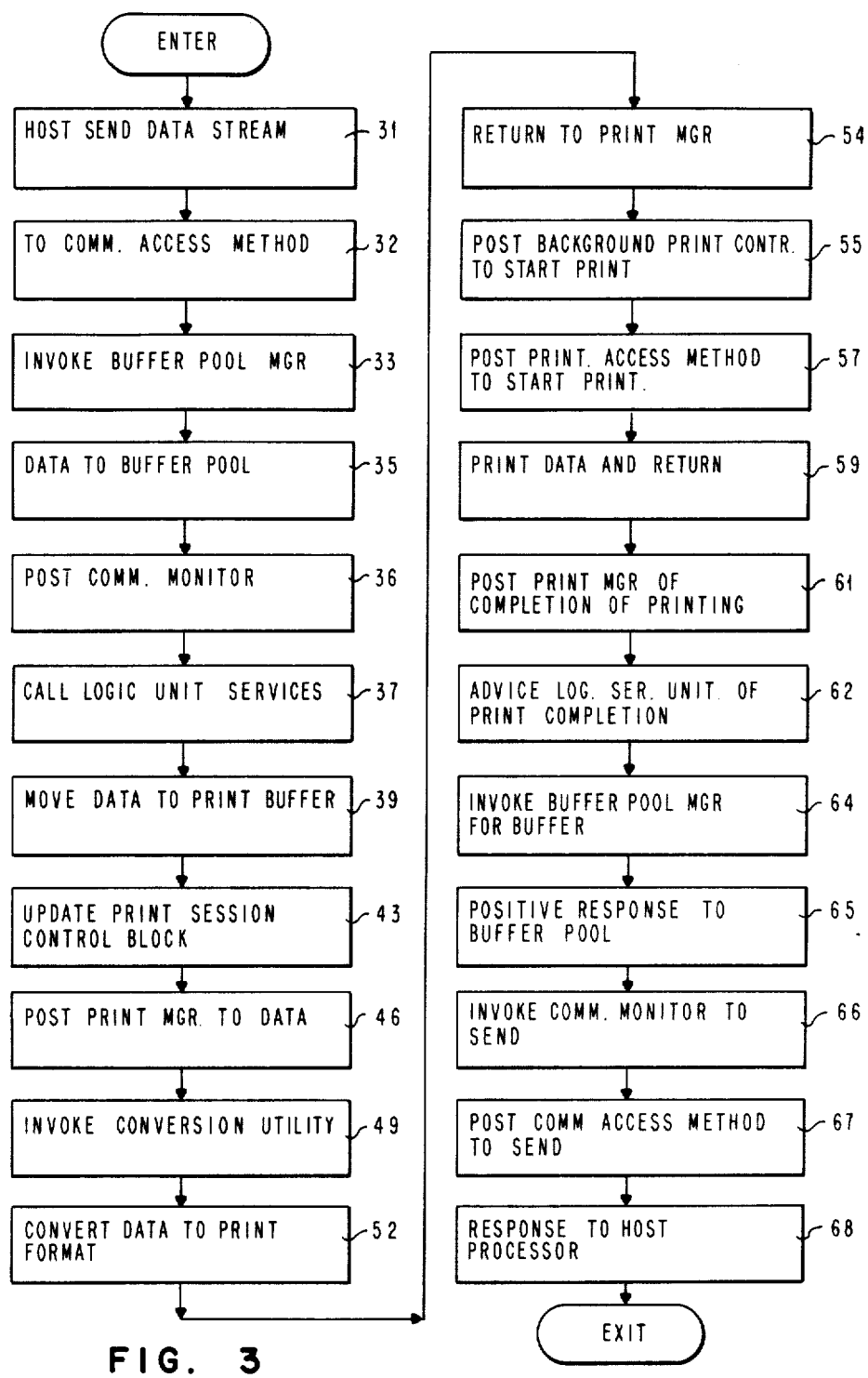
FIG. 3 shows a flow chart of a printing operation wherein alphanumeric data from the host processor is printed on a remote printer which provides a document with format parameters controlled by an intermediate processor.

With respect to FIG. 3, we will describe a printing operation of a data stream provided by the host data processor 10 through intermediate processor 13 to printer 11. The printing operation is initiated by the host 10 sending a data stream representative of the alphanumeric data to be printed on printer 11 over communication linkage 12 to intermediate processor 13 where the data is received in communication adapter 18 (step 31, FIG. 3). This data stream is forwarded to communication access method 26 in memory 19 (step 32). As a result, step 33, communications access method invokes buffer pool manager 34 which allocates the section of the buffer pool 30 for the storage of the received data stream. Then, step 35, the communication access method 26 sends the data over buss 29 to the designated portion of buffer pool 30, after which, communication access method 26 posts or updates communications monitor 28 to indicate the data stored in buffer pool 30 (step 36). At this point, step 37, communications monitor 28 calls logical unit services 38, and (step 39) under the control of the logical unit services 38 the data is moved along buss 40 through logical unit services 38 and buss 41 to printer buffer 42. Then, step 43, printer session control block 44 is updated over buss 45 to reflect what is stored in printer buffer 42. At this point, step 46, logical unit services 38 posts or activates printer manager function 47 over buss 48 to commence with the printing of the data. In response, step 49, printer manager 47 invokes conversion utilities unit 50 over buss 51 to convert the data in print buffer to the selected printing format. Conversion utilities unit 50 then proceeds to convert the data stored in printer buffer 42 to the desired print format (step 52) by reading the data from printer buffer 42 and applying values stored in conversion utilities control block 53 to convert the data. The converted data is stored in conversion utilities control block 53.

Upon the completion of the conversion, conversion utilities unit 50 returns to the printer manager 47 (step 54) with an indication of a successful completion of the conversion of the data to the print format. Then, step 55, printer manager 47 posts the background print control unit 56 to commence with the printing of the data whereupon background print control unit 56 posts or invokes (step 57) the printer access method 58 to print the data stored in conversion utilities control block 53. As a result, printer access method 58 provides an output over line 60 to the printer to activate the printer to print the data stored in conversion utilities control block 53 (step 59). Then, the process is returned to background print control 56.

At this point, step 61, background print control unit 56 posts or advises the printer manager 47 of the successful completion of the printing. In turn, step 62, printer manager 47 calls logical unit services 38 to advise that a printing has been successfully completed. The logical unit services 38 then invokes buffer pool manager 34 over buss 63 to provide the section in buffer pool 30 in which logical unit services 38 can formulate and store a response (step 64). The logical unit services 38 then builds (step 65) a positive response in buffer pool 30 over buss 40. At this point, step 66, the logical unit services 38 posts or invokes communications monitor 28 to send a response data stored in buffer pool 30. As a result, step 67, communication monitor posts or activates communication access method 26 to send the data from buffer pool 30, whereupon, step 68, the communication access method 26 sends the response formulated in buffer pool 30 indicative of the completion of the printing of the data back to the host processor 10 via buss 20 through communications adapter 18 and communication linkage 12.

Now with reference to FIG. 4, the operator utilizing keyboard 15 and interactive display terminal may select format parameters to be implemented on the printer 11 in order to format any data to be subsequently sent from data processor 10 into a selected repetitive document structure. In order to affect these changes, the intermediate processor 13 is placed in a mode wherein menus may be displayed on display terminal 14. This is the text processing mode or session described in previously referenced U.S. Pat. No. 4,458,311. Initially, step 70, the operator at keyboard 15 in FIG. 1 requests the options to change the printer format (step 70). The operator at keyboard 15 accesses keystroke services routine function 71 through the keyboard access method 72 (FIG. 2) under the control of the keyboard access method control logic block 73. Through the keystroke services routine 71 and particularly the request subroutine 74, the request menu processing function 75 in the memory of FIG. 2 is accessed (step 76). In response, step 77, the request menu processing function 75 posts or requests the printer manager function 47 to hold any printing which may be taking place on printer 11. At this point, step 78, the request menu processing function 75 under the control of the request menu processing control block 79 first determines from printer session control function 44 the type of printer session currently in affect. In addition, step 80, the request menu processing function 79 also determines the existing print parameters or defaults from conversion utilities control block 53. It should be noted that a default is a parameter which will automatically take affect if the operator makes no other choice.

At this point, step 81, the request menu processing function 79 invokes or activates the message services function 82 to commence the building and display of the printer format parameter menu. In response, the message services function 82 invokes the display access method 23 to display the menu (step 83). Then, to complete the display, step 84, the display access method puts the built menu into display refresh buffer 25 from which it is displayed on display terminal 14.

Figures 4, 5:
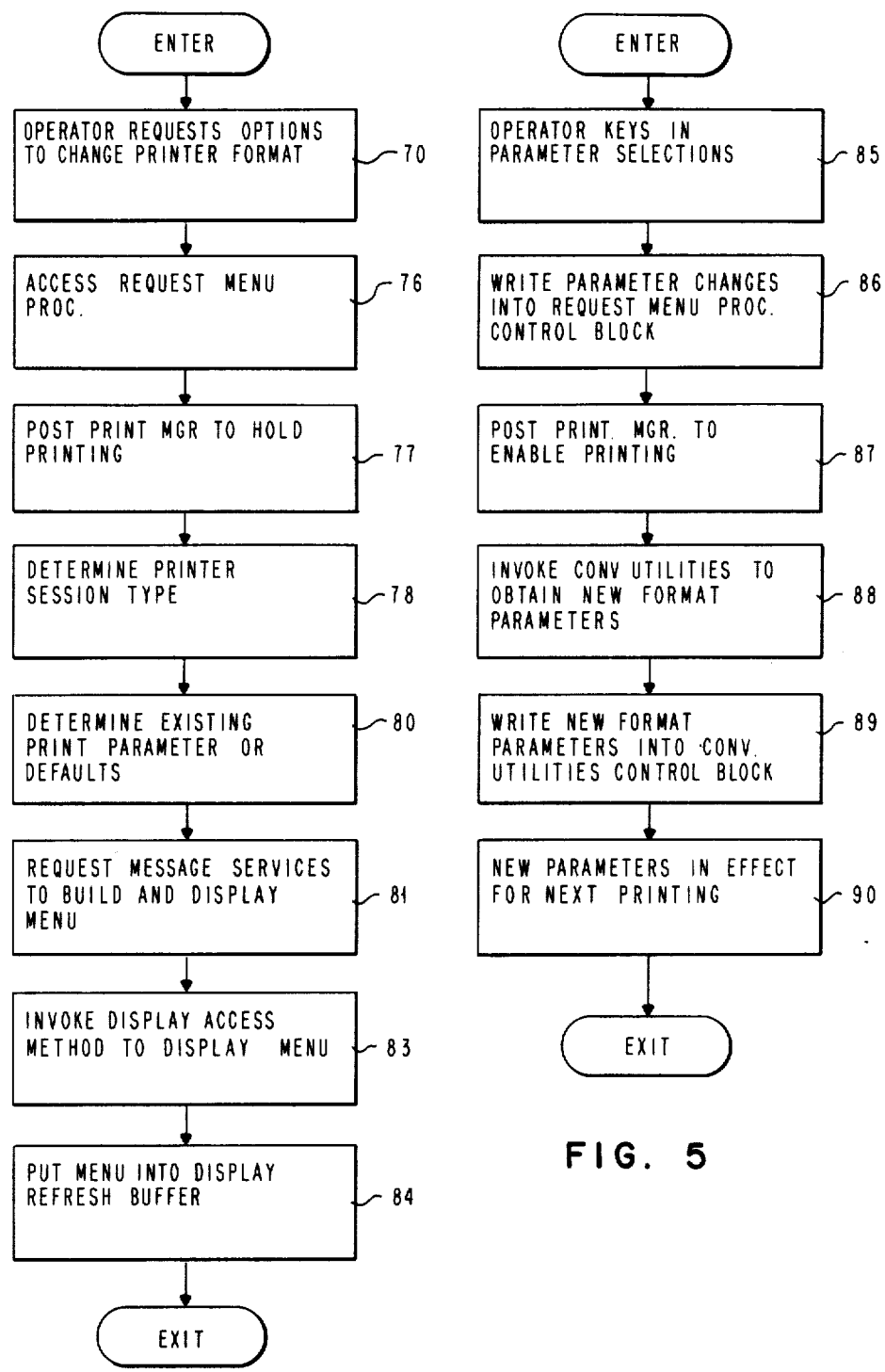
FIG. 4 is a flow chart of a procedure wherein the operator at the display of the intermediate processor who wishes to change formatting parameters brings up the menu of the alterable formatting parameters.
FIG. 5 is a flow chart of the procedure involved in the operator working from the menu of FIG. 4 to affect changes in the formatting parameters of the document to be produced.

Now with reference to FIG. 5, we are at a stage when processing in FIG. 4 has been completed and the menu for the selection of document format parameters for the printer is displayed to the operator. The operator at the keyboard 15 keys in parameter selections, step 85. This is done as previously described through keyboard 15 and keyboard access method 72 to key stroke services routine 71. Some typical formatting parameters which the operator may select from the menu relate to: (1) line spacing, (2) lines per inch, (3) maximum characters per line,(4) maximum lines per page, (5) pitch.

When the operator enters these changes, the request menu processing function 75 writes these parameter changes into the request menu processing control block 79 (step 86 in FIG. 5). At this point, step 87, the request menu processing function 75 posts printer manager 47 to once again enable the printing which had been halted in the procedure of FIG. 4. At this point, step 88, printer manager 47 invokes the conversion utilities function 50 to obtain from the request menu processing control block 79 the new printer document format parameters which have been keyed in by the operator. Conversion utilities function 50 then proceeds (step 89) to write these new document format parameters into conversion utilities control block 53. Finally, the new format parameters are in effect (step 90) for the next printing operation carried out.

While the invention has been particularly shown and described with reference to a preferred embodiment it will be understood by those skilled in the art that various other changes in form and detail may be made without departing from the spirit and scope of the invention.

We claim:

1. In a data processing system comprising a host processor and a remote printer controlled by said host processor to print alphanumeric data from a data stream communicated from said host to said printer, the improvement comprising
   an intermediate processor, connected between said host processor and said remote printer, having an interactive display terminal, said intermediate processor comprising,
   means connected between said interactive display terminal and said printer for controlling the set-up of format parameters of documents containing said alphanumeric data from said host processor,
   means connected to said host processor and said display terminal for displaying to an operator on said display terminal the format parameters of said documents available for said set-up controlling means,
   means connected to said interactive terminal and said printer for disabling printing of said printer of said alphanumeric data from said host processor during said controlling of the set-up of format parameters having new format parameters, said controlling means responding to selection of the new format parameters by the operator for dynamically changing said format parameters utilized by said remote printer in printing said documents containing data from the host processor, and
   means connected to said host processor and said printer for enabling printing of said printer of said alphanumeric data with said new format parameters.

2. The data processing system of claim 1 wherein said format parameters are parameters repetitive in a plurality of documents printed by said printer.

3. The data processing system of claim 1 wherein said host processor is a data processor and said intermediate processor is a text processor.

4. The data processing system of claim 3 wherein said format parameters include parameters related to the format of lines of alphanumeric characters printed on a page.

5. The data processing system of claim 3 wherein said format parameters include parameters related to the format of alphanumeric characters printed in the lines of said document.

6. The data processing system of claim 3 wherein said format parameters include parameters related to page size in a document having a plurality of pages.

* * * * *